United States Patent [19]

Schetter

[11] 4,452,094
[45] Jun. 5, 1984

[54] OVERDRIVE TRANSMISSION FOR AUTOMOTIVE VEHICLES

[75] Inventor: Thomas C. Schetter, Toledo, Ohio

[73] Assignee: Dana Corporation, Toledo, Ohio

[21] Appl. No.: 369,508

[22] Filed: Apr. 19, 1982

Related U.S. Application Data

[63] Continuation of Ser. No. 50,877, Jun. 21, 1979, abandoned.

[51] Int. Cl.³ .................. F16H 3/08; F16D 11/12
[52] U.S. Cl. ........................... 74/333; 74/370; 192/48.91
[58] Field of Search ............... 74/329, 330, 333, 356, 74/360, 361, 369, 370; 192/48.91

[56] References Cited

U.S. PATENT DOCUMENTS

| | | |
|---|---|---|
| 781,683 | 2/1905 | Schmidt . |
| 2,001,141 | 5/1935 | Kittilsen ..................... 74/329 |
| 2,115,390 | 4/1938 | Lasley et al. ............... 74/473 |
| 2,534,134 | 12/1950 | Kirkpatrick ................ 74/330 |
| 2,543,412 | 2/1951 | Kegresse ..................... 74/330 |
| 2,723,735 | 11/1955 | Banker ........................ 74/333 |
| 2,771,794 | 11/1956 | Shenk et al. ............... 74/764 |
| 2,939,328 | 6/1960 | Sinclair ....................... 74/330 |
| 3,150,530 | 9/1964 | Pittman et al. ............. 74/333 |
| 3,285,088 | 11/1966 | Atsumi et al. .............. 74/333 |
| 3,301,079 | 1/1967 | Fletcher et al. ............. 74/333 |
| 4,000,662 | 1/1977 | Wolfe .......................... 74/331 |
| 4,019,400 | 4/1977 | Stump ......................... 74/333 |
| 4,094,206 | 6/1978 | Sogo et al. .................. 74/360 |
| 4,136,575 | 1/1979 | Labat .......................... 74/359 |

FOREIGN PATENT DOCUMENTS 567418 12/1958 Canada ................... 74/330

Primary Examiner—Allan D. Herrmann
Assistant Examiner—Joseph M. Rolnicki
Attorney, Agent, or Firm—Fraser, Barker, Purdue & Clemens

[57] ABSTRACT

This invention provides an improved automotive transmission, particularly for highway trucks, wherein an overdrive condition of the transmission may be obtained by extension of the normal H-shaped shifting pattern of the gear shift lever. A direct drive condition of the transmission is obtained when the gear shift lever is in the forward position of the last lateral leg of an extended H shift pattern and the overdrive condition is obtained when the gear shift lever is in the rearward position of such last leg of the shifting pattern, thus requiring no unusual shifting movements on the part of the operator to effect the conversion of the transmission into the overdrive condition.

2 Claims, 4 Drawing Figures ized by the fact that said normal direct drive position of said shift lever is at the rearward end of the last leg of said extended H shifting pattern.

OVERDRIVE TRANSMISSION FOR AUTOMOTIVE VEHICLES

This is a continuation of application Ser. No. 050,877, filed June 21, 1979 now abandoned.

BACKGROUND OF THE INVENTION

A large variety of multi-speed transmissions for heavy duty trucks which must operate at highway speeds have heretofore been proposed. Thus, six-speed and eleven-speed transmissions are common in the art and a number of such transmissions have been heretofore equipped with an overdrive gearing condition wherein the drive ratio is on the order of 0.84 to 1.

Such prior art transmissions have normally employed the extended H pattern of shifting, with which every truck operator is intimately familiar, until it was desired to shift from direct drive to overdrive, whereupon the transmission lever was moved contrary to the normal movement pattern expected with the extended H shift pattern. As a result, it has been observed that drivers frequently shift prematurely into the overdrive condition by instinctively following the movements of the extended H shifting pattern. For example, in a six-speed transmission, prior art mechanisms have positioned the sixth-speed (normally the direct drive condition) of the gear shift lever at the rearward end of the last leg of the extended H shifting configuration, and the overdrive condition required the shift lever be moved to the forward end of such last leg. The result is that the operator, in shifting up from the next to the last leg, quite often habitually went directly into the overdrive position, skipping the direct drive position, and thus putting unnecessary load on the engine.

OBJECT OF THE INVENTION

It is, accordingly, an object of the invention to provide an improved multi-speed transmission, particularly for truck-type vehicles required to operate at highway speeds, wherein the overdrive condition of the transmission is achieved by the normal operator movement of the gear shift lever in the last leg of an extended H shifting pattern.

A particular object of the invention is to provide a clutch collar axially shiftable between a rearward direct drive position to a forward overdrive position and to effect appropriate gear connections by the collar in the two described positions to respectively achieve a direct drive condition of the transmission and an overdrive condition of the transmission.

Further objects and advantages of the invention will be readily apparent to those skilled in the art from the following detailed description, taken in conjunction with the annexed sheets of drawings.

DESCRIPTION OF PREFERRED EMBODIMENT

Figure 1:
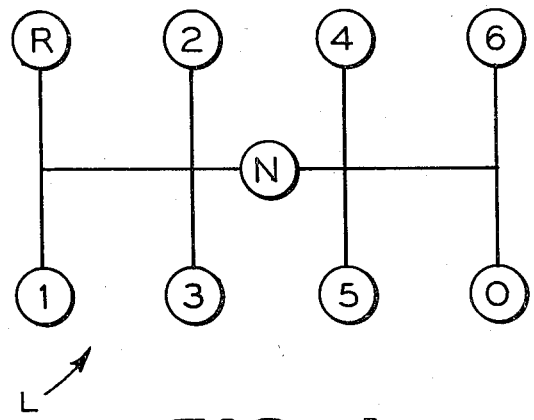
FIG. 1 is a schematic diagram of the desired positions of a gear shift lever for a transmission constructed in accordance with the present invention.

Referring first to FIG. 1, there is schematically indicated the desired positions of a gear shift lever L for a transmission constructed in accordance with this invention. Six forward speeds, plus a reverse speed R and an overdrive position O are provided. As is readily apparent from FIG. 1, the truck operator proceeds to shift through gears 1 through 5 with the conventional forward, rear, and lateral motions involved in an extended H shifting pattern. This same conventional motion is employed in shifting from the fifth gear position to the sixth gear position and then from the sixth gear position into overdrive. There is, therefore, no opportunity for the operator to make a habitual shift which would cause him to go directly from the fifth gear position to the overdrive position. This arrangement is in distinct contrast with existing truck transmissions wherein the overdrive position is normally located at the forward end of the extended H pattern, rather than at the rearward end as illustrated in FIG. 1.

Referring now to the remaining figures of the drawings, the desired shift pattern is conveniently accomplished by the unique cooperation of a shifting collar 30 incorporated in the transmission with the other elements.

The transmission is conventionally mounted in a housing 1 and comprises a bearing cover 2 through which an engine driven input shaft 3 extends and is supported for rotation by antifriction bearing 3a. The inward end of engine driven shaft 3 has an integral transmission input gear 4 formed on its periphery and also defines projecting hub portion 5 having a plurality of circumferentially-spaced splines 5a formed thereon. The extreme inner end of engine driven shaft 3 is of reduced diameter as indicated at 6 and is journalled by a suitable anti-friction bearing 7a provided in the center of a transmission output shaft 7.

As is well known to those skilled in the art, the transmission input gear 4 is continuously connected to a counter-shaft input gear 8 mounted on a conventional counter-shaft (not shown) which lies parallel to shafts 3 and 7. More than one such countershaft may be provided depending on the number of speeds for which the transmission is designed, but the number of counter-shafts employed has no effect on the applicability of this invention.

The inner end of output shaft 7 is disposed in concentric abutting relationship to the inner end of the engine driven shaft 3. A plurality of circumferentially spaced splines 7b are provided on the inner end of output shaft 7. A pair of floating gears 11 and 12 are respectively journalled in conventional fashion for rotational movement about the output shaft 7. Floating gear 11 is continuously engaged with an overdrive gear 13 which is secured to the counter-shaft (not shown).

Figure 2:
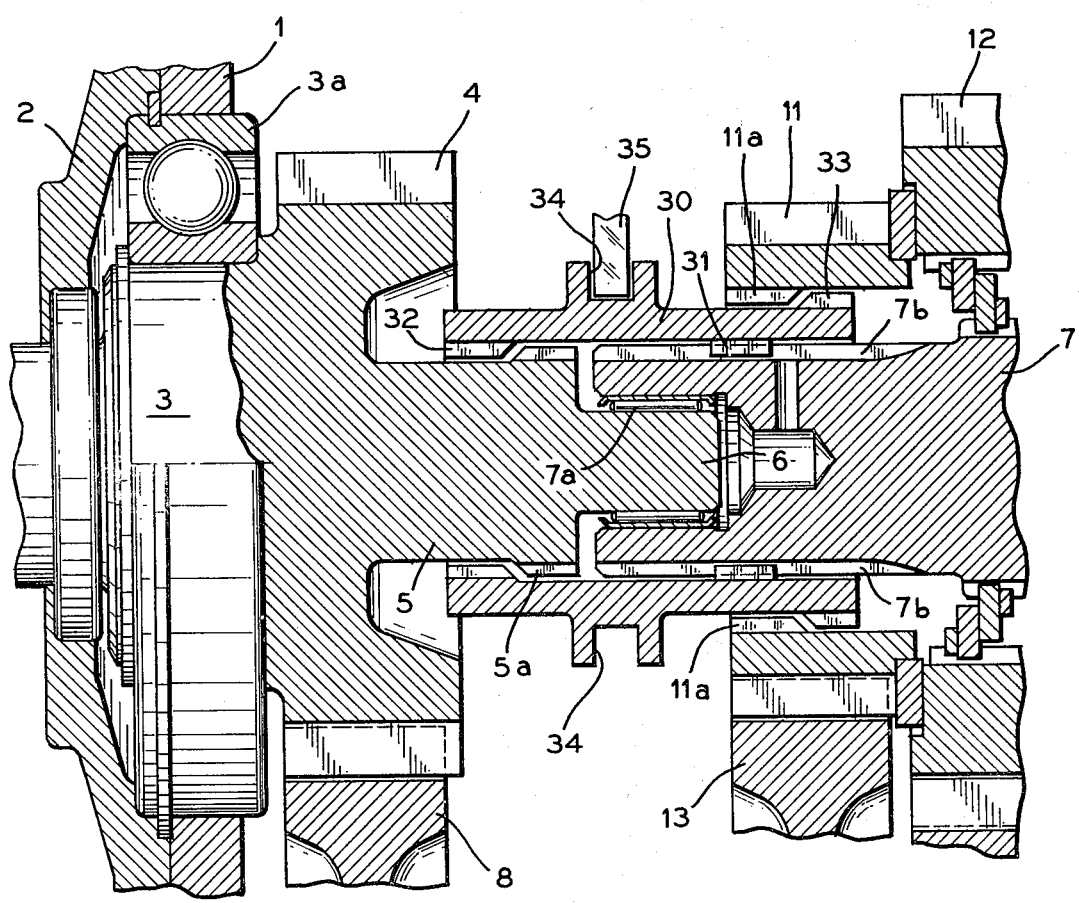
FIG. 2 is a fragmentary sectional view of a transmission having a shiftable clutch collar constructed in accordance with the present invention and located in the neutral position.

A shiftable clutch collar 30 is axially slidably mounted on the inner end of output shaft 7 by engagement of a first set of internally projecting splines 31 on collar 30 with the external splined portion 7b provided on output shaft 7. On its extreme left-hand end as viewed in FIG. 2, the shiftable clutch collar 30 is provided with a second set of internally projecting splines 32 which are slidably engageable and disengageable with the externally projecting splines 5a provided on the engine driven shaft 3. On the right-hand end of shiftable clutch collar 30 as viewed in FIG. 2, a plurality of circumferentially spaced external splines 33 are provided which are selectively engageable by axial movement of the shiftable clutch collar 30 with a set of internally projecting splines 11a provided on the floating gear 11.

The shiftable clutch collar 30 is axially movable through three positions relative to the output shaft 7 and the engine driven shaft 3. In the neutral or second position illustrated in FIG. 2, the internally projecting splines 32 provided on the left-hand end of the clutch collar 30 are disengaged from the splines 5a of the engine driven shaft 3 and, in the same position, the externally projecting splines 33 provided on the right-hand end of the shiftable clutch collar 30 are disengaged from the internally projecting splines 11a provided on the floating gear 11. It follows that in this neutral position, the clutch collar 30 has no effect on the transmission of power through the transmission and any power transmitted must be through the input gear 4, countershaft gear 8 on the countershaft and back to an appropriate selected gear on the output shaft 7.

Figure 3:
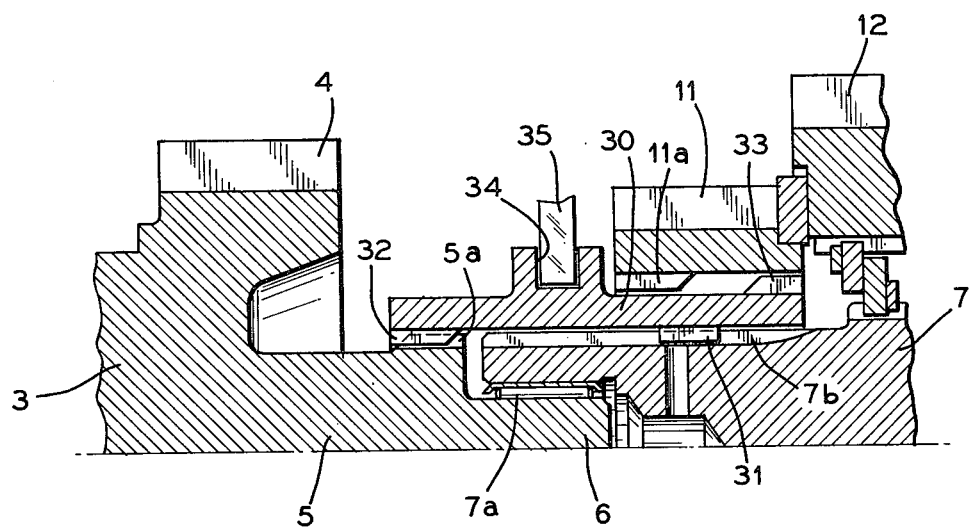
FIG. 3 is a sectional view similar to FIG. 2 but showing the shiftable clutch collar in the direct drive position.

Shiftable clutch collar 30 is connected by suitable linkage (not shown) to the operator actuated gearshift lever L of the vehicle. Such linkage is entirely conventional and includes a shifting fork 35 which engages an annular groove 34 provided in the medial portions of the shiftable clutch collar 30. Assuming that the engine is in the forward portion of the vehicle, a forward movement of the shift fork 35 will be effected by a reverse movement of the gear shift lever. Similarily, a rearward movement of the shift collar 30 would be effected by a forward movement of the gear shift lever. In the illustrated transmission, the sixth gear position constitutes the direct drive connection shown in FIG. 3. To achieve this condition of the transmission, the gearshift lever L is moved to the last forward position of the extended H shifting pattern schematically illustrated in FIG. 1 and designated as the sixth gear position. The forward movement of the gearshift lever L effects a rearward movement of the shiftable clutch collar 30 to the third or direct drive position and brings the internally projecting splines 32 on such clutch collar into engagement with the externally projecting splines 5a of the engine driven shaft 3, thus effecting a direct drive connection between the engine driven shaft 3 and the transmission output shaft 7.

Figure 4:
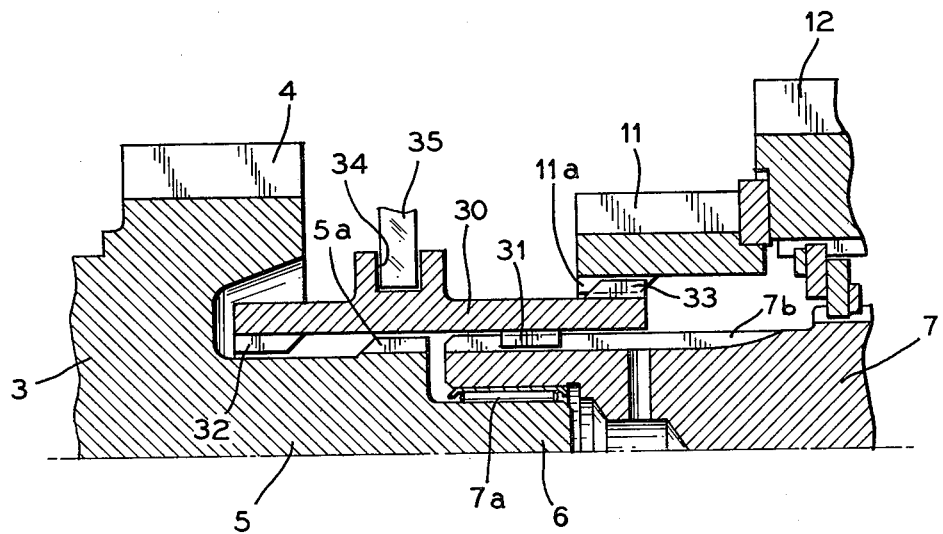
FIG. 4 is a sectional view similar to FIG. 2 but showing the shiftable clutch collar in the overdrive position.

The rearward shifting movement of the gearshift lever L to the overdrive position illustrated in FIG. 1 effects a forward axial shifting of the shiftable clutch collar 30 to the first or overdrive position shown in FIG. 4 wherein the clutch collar splines 32 are disengaged from the splines 5a of the engine driven shaft 3 and the external splines 33 of the clutch collar 30 are engaged with the internally projecting splines 11a of the floating gear 11. Thus, the power transmission flows from the input gear 4 on the engine driven shaft 3 to the counter-shaft input gear 8, to the counter-shaft (not shown) to an overdrive gear 13 on such counter-shaft, thence to the floating gear 11 and then through the engagement of the splines 33 of the clutch collar 30 to the output shaft 7. Hence a reduction of the speed ratio to a value less than the 1 to 1 direct drive ratio employed in the sixth gear position is achieved. This drive ratio may, for example, be 0.84 to 1, which permits the truck motor to operate at a most efficient range while the truck is running at maximum highway speed.

The terms "forward" and "rearward" employed in the specification and claims will be recognized by those skilled in the art as being merely relative to describe the motions of the collar and the gearshift lever in the conventional truck transmission arrangement when the engine is in the forward part of the truck. The important feature of the invention is that the gear shifting proceeds through the normal extended H pattern up through the direct drive gear position and thence into the overdrive position without changing the shifting pattern which the driver tends to automatically follow, due to his long experience with the required movements of the extended H pattern in shifting through the lower speed gears.

Modifications of this invention will be readily apparent to those skilled in the art and it is intended that the true scope of the invention be determined solely by the appended claims.

What is claimed is:

1. A clutching mechanism for an automotive transmission comprising, in combination, an input shaft having an end and defining an axis, an output shaft having an end and disposed coaxially with said axis, said ends of said shafts disposed in generally abutting relationship, an annular array of circumferentially-spaced externally-extending splines disposed on said input shaft adjacent said end and having an outside diameter larger than the diameter of said input shaft, an annular array of circumferentially-spaced externally-extending splines disposed on said output shaft, an annular gear disposed for rotation about said output shaft and said axis, said annular gear including an annular array of circumferentially-spaced internally-extending splines disposed more proximate said end of said output shaft and defining a region having an inside diameter larger than the inside diameter of said internal splines, an elongate annular clutch element disposed for rotation about said axis and translation along said axis among a first position, a second position and a third position, said element including a first annular array of circumferentially-spaced internally-extending spline means for engaging said annular array of external splines disposed on said output shaft in said first, second and third positions, a second annular array of circumferentially-spaced internally-extending spline means disposed on said clutch element for engaging said external splines disposed on said input shaft only in said third position, a region between said arrays of internal spline means having an inside diameter larger than the inside diameter of said second array of internal spline means, an annular array of circumferentially-spaced externally-extending spline means disposed on said clutch element for engaging said internal splines disposed on said annular gear only in said first position and a region adjacent said external spline means having an outside diameter less than the outside diameter of said external spline means and means for effecting selective axial translation of said clutch element among said first position, said second position and said third position, whereby direct drive is achieved between said input shaft and said output shaft in said third position of said clutch element.

2. The clutching mechanism of claim 1 wherein said first position of said clutch element is more proximate said input shaft, said third position is more proximate said output shaft and said second position is between said first and third positions.

* * * * *